(12) United States Patent
Pan et al.

(10) Patent No.: US 8,255,759 B2
(45) Date of Patent: Aug. 28, 2012

(54) APP (A PRIORI PROBABILITY) STORAGE DESIGN FOR LTE TURBO DECODER WITH QUADRATIC PERMUTATION POLYNOMIAL INTERLEAVER

(75) Inventors: Hanfang Pan, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 12/608,919

(22) Filed: Oct. 29, 2009

(65) Prior Publication Data

US 2011/0107019 A1 May 5, 2011

(51) Int. Cl.
*G06F 12/00* (2006.01)
(52) U.S. Cl. .......................................... 714/752
(58) Field of Classification Search .................. None
See application file for complete search history.

(56) References Cited

U.S. PATENT DOCUMENTS

| 7,530,011 | B2 * | 5/2009 | Obuchii et al. | 714/794 |
| 2004/0025103 | A1 * | 2/2004 | Obuchii et al. | 714/755 |
| 2008/0270868 | A1 * | 10/2008 | Shinagawa et al. | 714/752 |
| 2008/0301383 | A1 | 12/2008 | Nieminen | |

FOREIGN PATENT DOCUMENTS

| EP | 1947773 A1 | 7/2008 |
| WO | WO2009134846 A1 | 11/2009 |

OTHER PUBLICATIONS

3GPP TSG RAN WG1 #48, R1-071195, "QPP Interleaver Parameters", St. Louis, USA, Feb. 12-16, 2007.
Jing Sun and Oscar Takeshita, "Interleavers for Turbo Codes Using Permutation Polynomials Over Integer Rings", IEEE Trans. Information Theory, vol. 51, No. 1, 2005, pp. 101-119.
Oscar Takeshita, "On Maximum Contention-Free Interleavers and Permutation Polynomials Over Integer Rings", IEEE Trans. Information Theory, vol. 52, No. 3, 2005, pp. 1249-1253.
Benedetto S, et al., "Mapping Interleaving Laws to Parallel Turbo Decoder Architectures", Mar. 1, 2004, IEEE Communications Letters, IEEE Service Center, Piscataway, NJ, US, pp. 162-164, XP011109552, ISSN: 1089-7798.
International Search Report and Written Opinion—PCT/US2010/054703—ISA/EPO—Jun. 6, 2006.

* cited by examiner

*Primary Examiner* — Brian Peugh
(74) *Attorney, Agent, or Firm* — Peter A. Clevenger

(57) ABSTRACT

Systems and methodologies are described that facilitate ensuring contention and/or collision free memory within a turbo decoder. A Posteriori Probability (APP) Random Access Memory (RAM) can be segmented or partitioned into two or more files with an interleaving sub-group within each file. This enables parallel operation in a turbo decoder and allows a turbo decoder to access multiple files simultaneously without memory access contention.

58 Claims, 10 Drawing Sheets

APP (A PRIORI PROBABILITY) STORAGE DESIGN FOR LTE TURBO DECODER WITH QUADRATIC PERMUTATION POLYNOMIAL INTERLEAVER

BACKGROUND

I. Field

The following description relates generally to wireless communications, and more particularly to storage design in order to reduce memory collisions within a portion of memory storage.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network.

Turbo code is oftentimes used for reliable communication in a wireless communication system, where the transmitter uses turbo encoder to encode information bits while the receiver decodes the transmitted bits using a turbo decoder (TDEC). A turbo decoder can include a portion of memory, typically A Posteriori Probability (APP) Random Access Memory (RAM), to exchange information between different parts of a turbo decoder. For example, the turbo decoder can include two Maximum A Posteriori (MAP) decoders that can share the APP RAM. Due to the high throughput demand of the turbo decoder in order to support wide bandwidth and multiple-in-multiple-out (MIMO), memory collision and/or contention can occur. For example, sharing the APP RAM between MAP decoders can cause memory contention and/or collision based on the loading or unloading of values to/from APP RAM, which undesirably reduces the processing throughput of a turbo decoder. Therefore, there is a need to design APP RAM such that multiple MAP decoders can share the APP RAM without causing memory access contention.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates employing a turbo decoder that provides contention free memory access. The method can include identifying an A Posteriori Probability (APP) Random Access Memory (RAM). Further, the method can include organizing the APP RAM into at least two files. Moreover, the method can comprise dividing all the APP values into at least two interleaving sub-groups based on a Quadratic Permutation Polynomial (QPP) turbo interleaver. The method can additionally include mapping separate interleaving sub-groups to separate RAM files.

Another aspect relates to a wireless communications apparatus. The wireless communications apparatus can include at least one processor configured to identify an A Posteriori Probability (APP) Random Access Memory (RAM), organize the APP RAM into at least two files, divide all the APP values into at least two interleaving sub-groups based on a Quadratic Permutation Polynomial (QPP) turbo interleaver, and map separate interleaving sub-groups to separate RAM files. Further, the wireless communications apparatus can include memory coupled to the at least one processor.

Yet another aspect relates to a wireless communications apparatus that employs a turbo decoder that provides contention free memory access. The wireless communications apparatus can include means for identifying an A Posteriori Probability (APP) Random Access Memory (RAM). Additionally, the wireless communications apparatus can comprise means for organizing the APP RAM into at least two files. Further, the wireless communications apparatus can comprise means for dividing all the APP values into at least two interleaving sub-groups based on a Quadratic Permutation Polynomial (QPP) turbo interleaver. Moreover, the wireless communications apparatus can comprise means for mapping separate interleaving sub-groups to separate RAM files.

Still another aspect relates to a computer program product comprising a computer-readable medium having stored thereon code causing at least one computer to identify an A Posteriori Probability (APP) Random Access Memory (RAM), organize the APP RAM into at least two files, divide all the APP values into at least two interleaving sub-groups based on a Quadratic Permutation Polynomial (QPP) turbo interleaver, and map separate interleaving sub-groups to separate RAM files.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various

DETAILED DESCRIPTION

Figure 1:
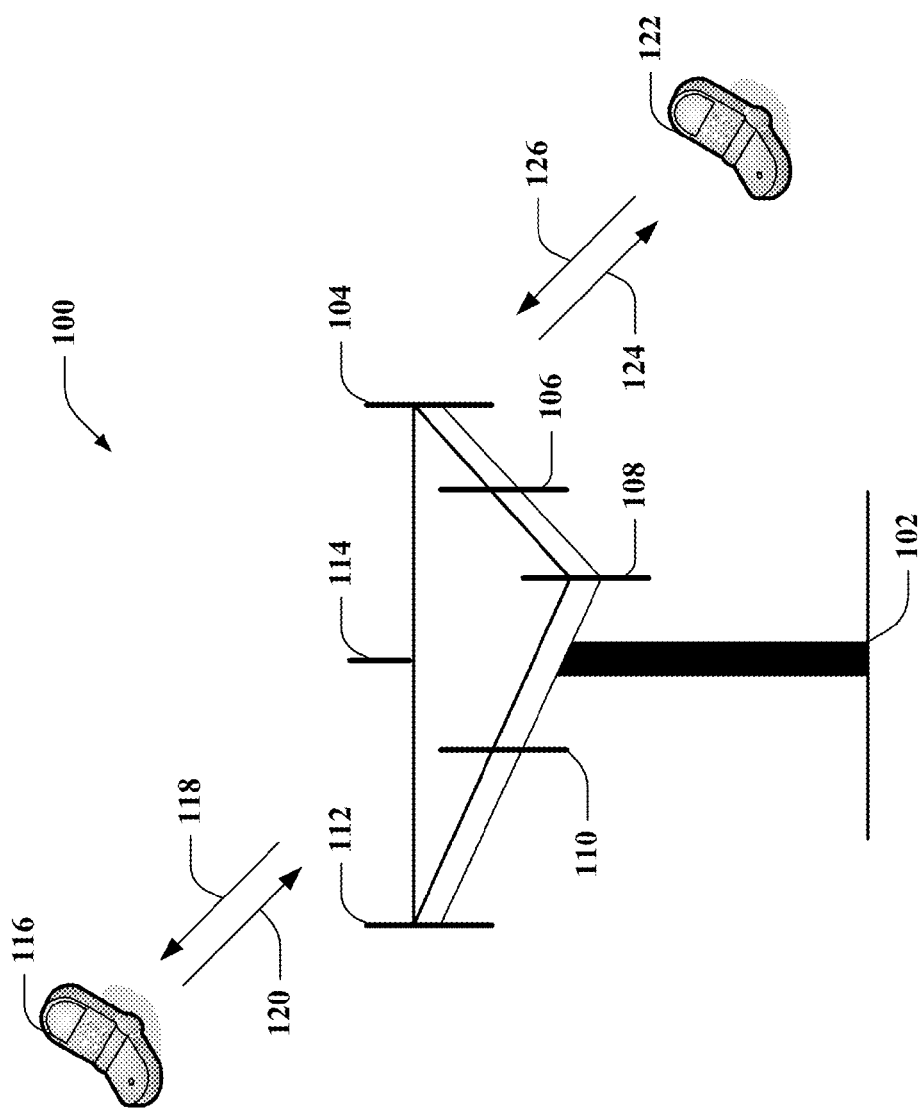
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "system," "interleaver," "unit," "decoder," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting—Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can employ partition techniques for a portion of memory utilized within a turbo decoder in order to reduce and/or eliminate memory collisions during read and/or write operations within a clock cycle. An A Posteriori Probability (APP) Random Access Memory (RAM) can be evaluated in order to identify a partitioning and/or an organization of the APP RAM into files. The goal of the partition and/or organization is such that the turbo decoder never accesses (reads or writes) more than one address of any of the files within any clock cycle. If the turbo decoder needs to access more than one address of any of the files, a memory access contention occurs. Such a contention will cause the turbo decoder to stop and wait while the contention is being resolved. This will inevitably reduce the processing throughput of the turbo decoder.

Figure 2:
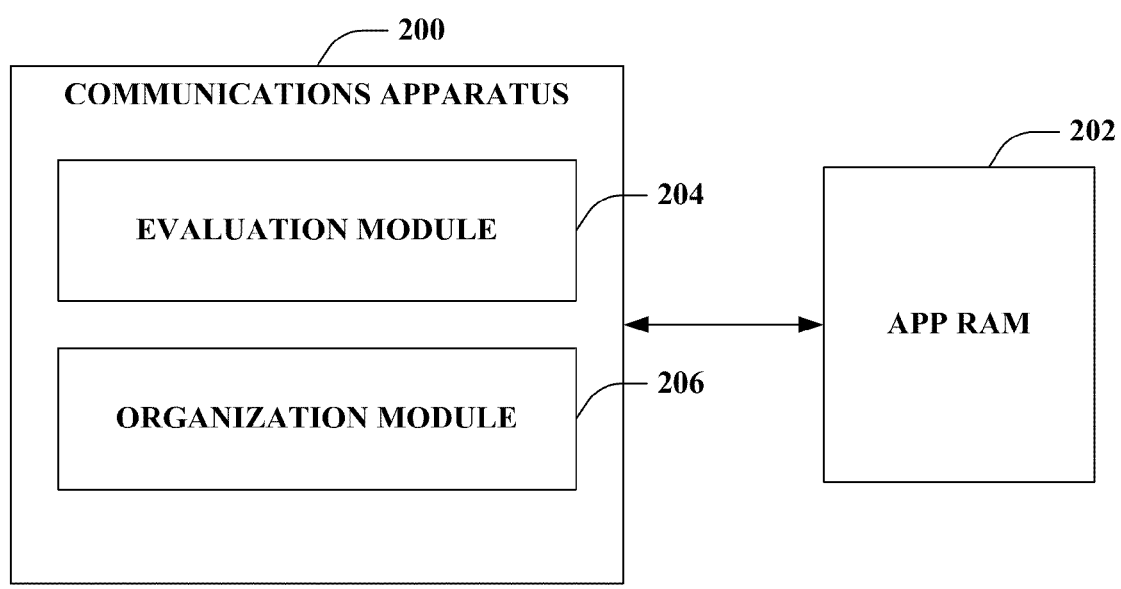
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. It is to be appreciated that the communications apparatus 200 can be a base station (e.g., access point, Node B, eNode B, etc.) and/or a user equipment (e.g., mobile station, mobile device, and/or any number of disparate devices (not shown)). The communications apparatus 200 can transmit information over a forward link channel or downlink channel; further the communications apparatus 200 can receive information over a reverse link channel or uplink channel; further the communications apparatus 200 can transmit information over a reverse link channel or uplink channel; further the communications apparatus 200 can receive information over a forward link channel or downlink channel. Moreover, communications apparatus 200 can be utilized in a MIMO system. Additionally, the communications apparatus 200 can operate in an OFDMA wireless network (such as 3GPP, 3GPP2, 3GPP LTE, etc., for example). In communications systems, the communications apparatus 200 employ components described below to evaluate A Posteriori Probability (APP) Random Access Memory (RAM) and create a partitioning of the memory based on the evaluation in order to reduce memory collisions.

The communications apparatus 200 can include an evaluation module 204 that can identify and examine an APP RAM 202. It is to be appreciated that although the APP RAM 202 is depicted separate of the communications apparatus 200, the APP RAM 202 can be incorporated into the communication apparatus 200, a stand-alone RAM, or any suitable combination thereof. The evaluation module 204 can evaluate the APP RAM 202 in order to collect information such as, but not limited to, size, number of MAP decoders sharing the APP RAM 202, etc. The communications apparatus 200 can further include an organization module 206 that can partition and/or segment the APP RAM 202. For example, the organization module 206 can segment and/or partition the APP RAM 202 based upon the evaluation of the APP RAM 202. The organization module 206 can create two or more files based upon the size of the APP RAM 202, and/or the number and the implementation of MAP decoders. The organization module 206 can divide all the APP values into at least two interleaving sub-groups based on a Quadratic Permutation Polynomial (QPP) turbo interleaver. The organization module 206 can map separate interleaving sub-groups to separate RAM files. The evaluation of APP RAM partition and APP RAM organization can also be fixed.

For example, the organization module 206 can organize the APP RAM 202 into four RAM files. Suppose there are a total of 4L APP values, denoted by P[0]. P[1], . . . , P[4L−1]. In this example, the first file can contain the APP values of P[4i], the second file can contain the APP values for P[4i+1], the third file can contain the APP values for P[4i+2], and the last file can contain the APP values for P[4i+3], where i is the index of the entries within each file. The index i ranges from 0 to L−1, where L is the size of each of the four files. In another example, the organization module 206 can organize the APP RAM 202 into eight RAM files. Suppose there are a total of 8L APP values, denoted by P[0]. P[1], . . . , P[8L−1]. In this example, the first file can contain the APP values of P[8i], the second file can contain the APP values for P[8i+1], the third file can contain the APP values for P[8i+2], . . . , and the last file can contain the APP values for P[8i+7], where i is the index of the entries within each file. The index i ranges from 0 to L−1, where L is the size of each of the eight files Moreover, although not shown, it is to be appreciated that communications apparatus 200 can include memory that retains instructions with respect to identifying an A Posteriori Probability (APP) Random Access Memory (RAM), organizing the APP RAM into at least two files, and the like. Further, communications apparatus 200 can include a processor that may be utilized in connection with executing instructions (e.g., instructions retained within memory, instructions obtained from a disparate source, . . . ).

Figure 3:
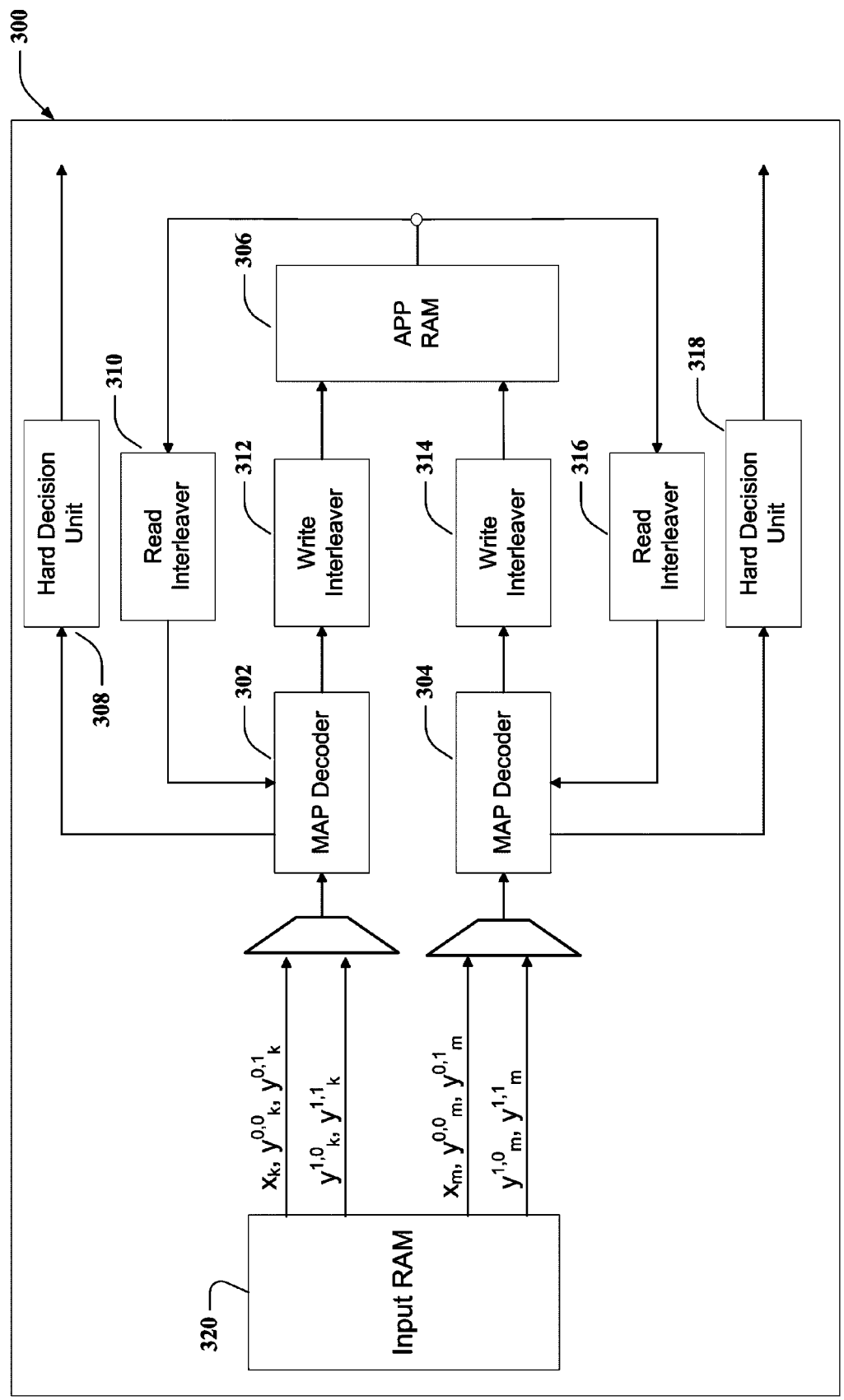
FIG. 3 is an illustration of an example turbo decoder in accordance with the subject innovation.

Now referring to FIG. 3, illustrated is an example turbo decoder 300 with two MAP decoders in accordance with the subject innovation. The turbo decoder 300 can include a MAP decoder 302, a MAP decoder 304, an APP RAM 306, a hard decision unit 308, a read interleaver 310, a write interleaver 312, a write interleaver 314, a read interleaver 316, and a hard decision unit 318. It is to be appreciated that both the MAP decoder 302 and the MAP decoder 304 access the APP RAM 306 for read and/or write APP values. The subject innovation can provide segmenting or partitioning the APP RAM 306 into files in order to prevent memory collisions and/or memory contention.

Internal TDEC implementations can have various features. In the example turbo decoder 300 with two MAP decoders, one MAP decoder covers the first half of the trellises (from 0 to N/2−1), the other MAP decoder covers the second half trellises (from N/2 to N−1), where N is the length of a (Turbo) code block. This provides an order of two of parallelism. The two MAP decoders defines their trellis directions in opposite ways. The forward trellis for the first MAP decoder is from 0 to N/2−1, and the reverse trellis is from N/2−1 to N. This is so because the initial state at zero is known (all-zero state). For the second MAP decoder, the trellis directions are the opposite. The forward trellis for the second MAP decoder is from N−1 to N/2, and the reverse trellis is from N/2 to N−1. This is so because the ending state at N is also known (all-zero state).

Rather than computing the forward and reverse state metrics of the entire N/2 trellis, which would require tremendous amount of memory to store all state metrics, the length N/2 trellises for each MAP decoder can be further split into M non-overlapping windows, each of length L, forward and reverse state metrics calculations are carried out first for the first window, then the second window, and so on. Furthermore, the MAP decoders 302 and 304 can be implemented using radix-4 trellis. That is, two contiguous radix-2 trellises are aggregated as one single radix-4 trellis (See FIG. 5).

Ignoring some overhead, the above example implementation processes 4 code trellis transitions every clock cycle with two transitions done in the first Radix-4 MAP decoder and two transitions in the other MAP decoder. In order to fully exploit this processing capability, the follow two criteria need to be satisfied.

Criteria 1: Four sets of input samples can be read each clock cycle without memory access contention, where the each set of input sample include sample for one or zero systematic bit (one for the first constituent code (CC) and zero for the second CC), two samples for parity bits (due to ⅓ CC code rate), and one APP value. Depending on whether the MAP decoding corresponds to the first constituent code or the second constituent code, the addresses of these four sets are either $m \cdot L+2k$, $m \cdot L+2k+1$, $n \cdot L+L-1-2k$, and $n \cdot L+L-2-2k$ or $\pi(m \cdot L+2k)$, $\pi(m \cdot L+2k+1)$, $\pi(n \cdot L+L-1-2k)$, and $\pi(n \cdot L+L-2-2k)$, where m,n are some sliding window indices, and $k \in \{0, 1, \ldots, L/2-1\}$ is related to clock cycle within a sliding window. The first two addresses are next to each other (either without turbo interleaver or with turbo interleaver) due to Radix-4 implementation. Similarly, the last two addresses. The first two addresses corresponding to the first MAP decoder, where input sample loading is done from the beginning of a window to the end of a window. The last two addresses corresponding to the second MAP decoder, where input sample loading is done in the opposite way, e.g., from the end of a window to the beginning of a window.

Criteria 2: Four APP values can be written in each clock cycle without memory access contention. The addresses of these APP values are in a format of m·L+2k, m·L+2k+1, n·L+L−1−2k, and n·L+L−2−2k or π(m·L+2k), π(m·L+2k+1), π(n·L+L−1−2k), and π(n·L+L−2−2k), depending whether the MAP decoding corresponds to the first constituent code or the second constituent code. m, n, and k are defined as previously.

How to design APP layout to satisfy the above criteria is related to turbo interleaver structure. In one example, the turbo interleaver for LTE is defined using Quadratic Permutation Polynomial (QPP).

A QPP interleaver is defined as follows:

$$\pi(i)=f_1\cdot i+f_2\cdot i^2 \bmod N,$$

where $f_1$ and $f_2$ are the coefficients defined the quadratic polynomial, and N is the length of the interleaver. A polynomial is said to be a permutation polynomial if it defines a one-to-one mapping of $\{0, 1, \ldots, N-1\} \rightarrow \{0, 1, \ldots, N-1\}$ The parameters of the QPP interleavers defined for LTE can be identified for various code block sizes. There can be a total of 188 interleaver sizes defined for LTE. All interleaver sizes can be at least byte-aligned. When $40 \leq N \leq 512$, interleaver sizes are all multiples of 8. When $512 \leq N \leq 1024$, interleaver sizes are all multiples of 16. When $1024 \leq K \leq 2048$, interleaver sizes are all multiples of 32. When $2048 \leq K \leq 6144$, interleaver sizes are all multiples of 64.

Suppose N can be factorized as $$N = \prod_{i=1}^{m} p_i^{n_i},$$

where $p_i$'s are distinct prime numbers and $n_i$'s are the corresponding power exponentials. It can be proven that if π(x) is a QPP with modulo N, π(x) is also a permutation polynomial with modulo $p_i^{n_i}$.

It can also be proven that π(x) is also a permutation polynomial modulo $p_i^m$ for any $0<m\leq n_i$. Combining the above two factors, it can be shown that the QPP interleaver has the following sub-group interleaving property: for any M that divides N, For any $0 \leq m,n \leq N/M$, and $0 \leq k,l \leq M-1$ $\pi(m\cdot M+k) \bmod M = \pi(n\cdot M+k) \bmod M$ $\pi(m\cdot M+k) \bmod M \neq \pi(n\cdot M+l) \bmod M$ when $k \neq l$ From the above, N addresses from 0 to N−1 can be divided into M sub-groups, where the k-th sub-group includes the addresses of $\{m\cdot M+k:0\leq m\leq N/M-1\}$. Then all the addresses in a sub-group remain as one sub-group even after interleaving. Moreover, addresses in different sub-groups belong to different sub-group after interleaving. That is, turbo interleaving is effectively within each sub-group.

Even though the integrity of a sub-group is maintained with interleaving, the actual interleaving operation within a sub-group needs to be calculated using the original QPP formula, and this needs to be done for each sub-group.

In the example implementation above, the TDEC needs to access APP values with indices m·L+2k, m·L+2k+1, n·L+L−1−2k, and n·L+L−2−2k and n·L+L−2−2k or π(m·L+2k), π(m·L+2k+1), π(n·L+L−1−2k), and π(n·L+L−2−2k), including four reads and four writes per clock cycle. The simultaneous read and write is resolved via dual-port RAM design. To ensure contention free among the four reads or writes, the whole N APP values are divided into M=4 sub-groups as an example. Correspondingly, 4 RAM banks are used, where the first RAM bank can contain the APP values of P[4i], the second RAM bank can contain the APP values for P[4i+1], the third RAM bank can contain the APP values for P[4i+2], and the last RAM bank can contain the APP values for P[4i+3]. Typical value for L is 32/64/128. It is easy to check that with these values for L the four addresses, either:

m·L+2k, m·L+2k+1, n·L+L−1−2k, and n·L+L−2−2k or

π(m·L+2k), π(m·L+2k+1), π(n·L+L−1−2k), and π(n·L+L−2−2k)

always belong to different sub-groups hence are stored in different RAM banks, thanks to the sub-group interleaving property of QPP. As a result, the above mentioned APP values can always be accessed simultaneously without any contention or collision.

As an example, dual-port RAM in the above example can be avoided by dividing the APP values into eight interleaving sub-groups with each sub-group stored in a separate single-port RAM file. Single port RAM can either be read or written at any time. Four reads and four writes per clock cycle can still be archived by reading eight values, one from each RAM file, in one clock cycle and writing eight values, one for each RAM file, in the next clock cycle, and so on.

Given the fact that all code block sizes are multiplies of 8, up to 8 simultaneous APP accesses is feasible by partitioning the APP values in eight RAN banks with each interleaving sub-group in one RAM bank. For large code block size, which are multipliers of 16, 32, or 64, up to 16, 32, or 64 simultaneous APP accesses can be done by partitioning the APP values in 16, 32, or 64 RAM banks, respectively, with each interleaving sub-group stored in one RAM bank.

Figure 4:
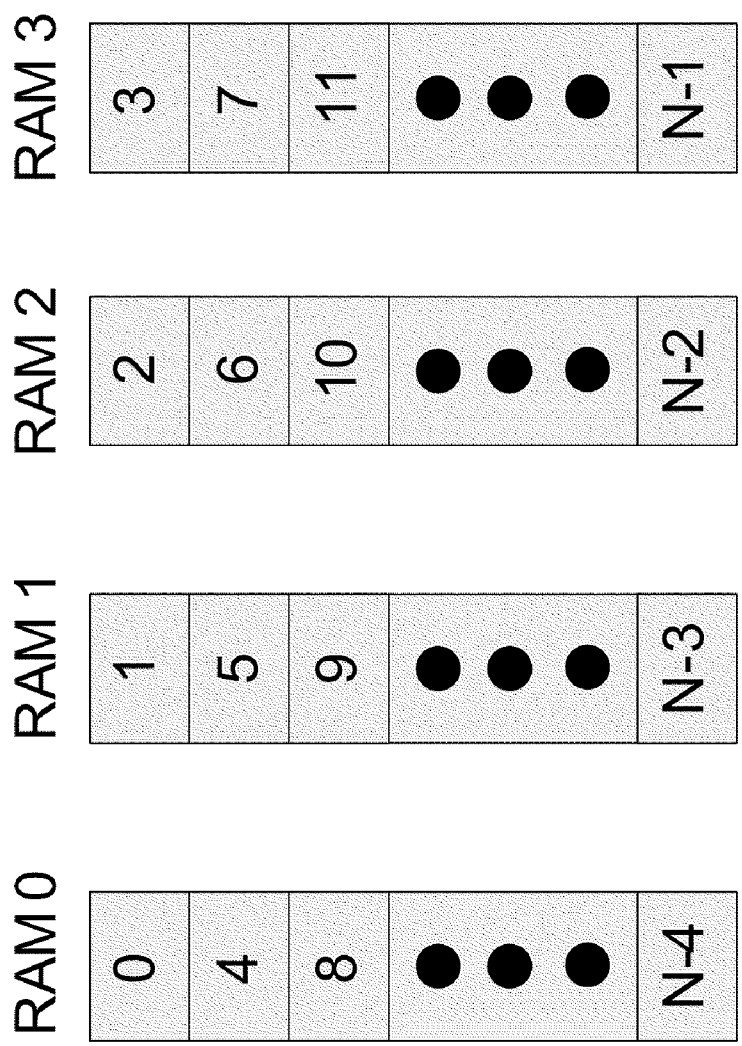
FIG. 4 is an illustration of an example A Posteriori Probability (APP) Random Access Memory (RAM) design that includes four sub-groups in accordance with the subject innovation.

Now referring to FIG. 4, an example A Posteriori Probability (APP) Random Access Memory (RAM) design 400 that includes four sub-groups in accordance with the subject innovation is illustrated. The APP RAM design 400 can include four files (e.g., indicated by RAM0, RAM1, RAM2, and RAM3). The APP values are divided into four interleaving sub-group with each sub-group stored in one RAM file.

TDEC needs to calculate the interleaver or the deinterleaver addresses during Turbo iterations. The calculation is straightly based on the QPP. QPP calculation logic needs to be instantiated multiple times, one for each sub-group, in order to calculate one interleaver address for each sub-group within each clock cycle.

Figure 5:
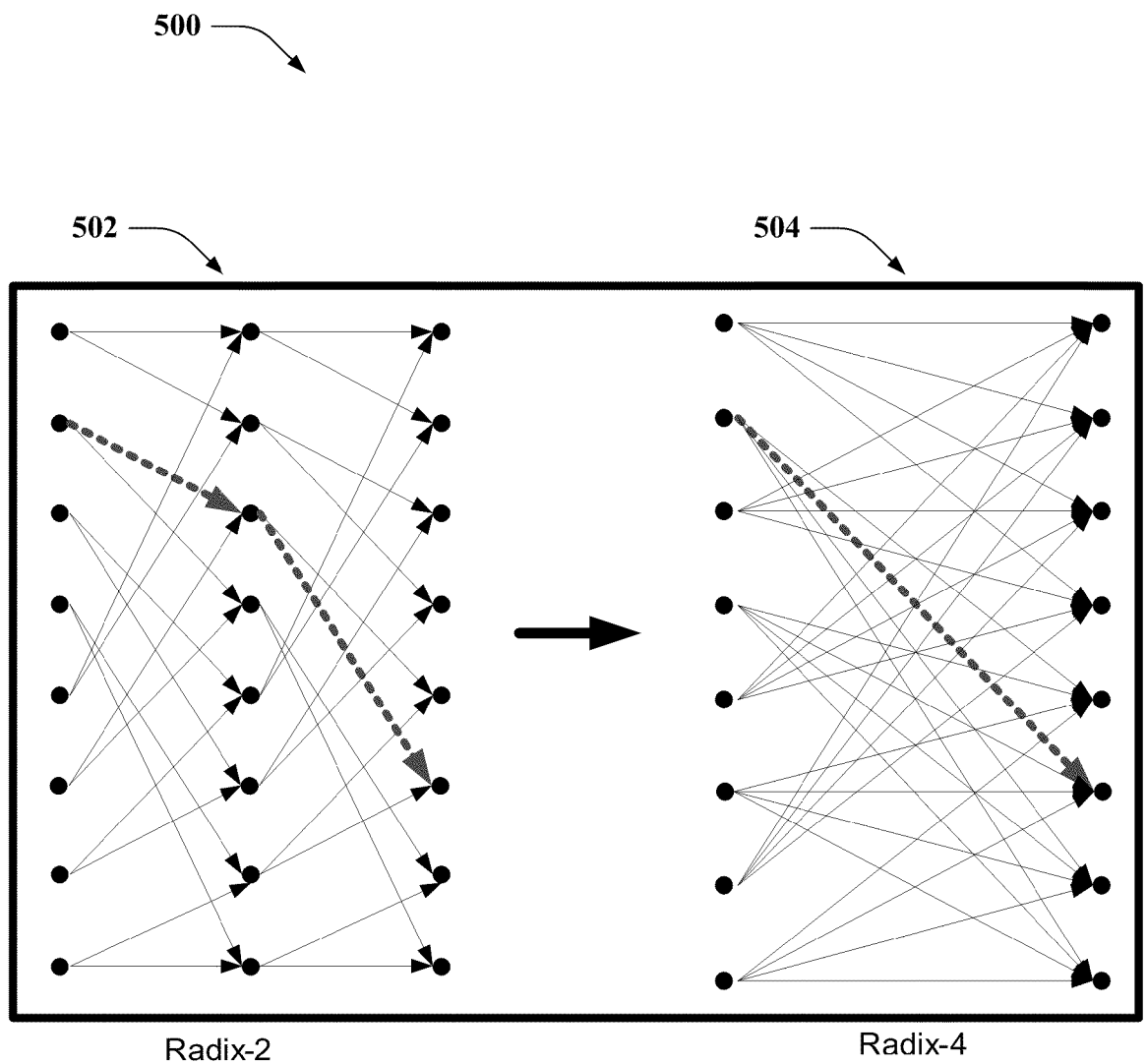
FIG. 5 is an illustration of a radix-2 configuration and a radix-4 configuration.

Quickly referring to FIG. 5, an illustration 500 of a radix-2 configuration and a radix-4 configuration are depicted. A radix-2 502 can be illustrated as well as a radix-4 504. It is to be appreciated that the MAP decoders within a turbo decoder can be implemented as a radix-4 configuration. Within radix-4 504, two trellis transitions can be traveled in one clock cycle. Moreover, within radix-4 504, more complicated state metric calculations exist. Thus, with radix-4 504, two values from APP RAM are accessed within each clock cycle.

Figure 6:
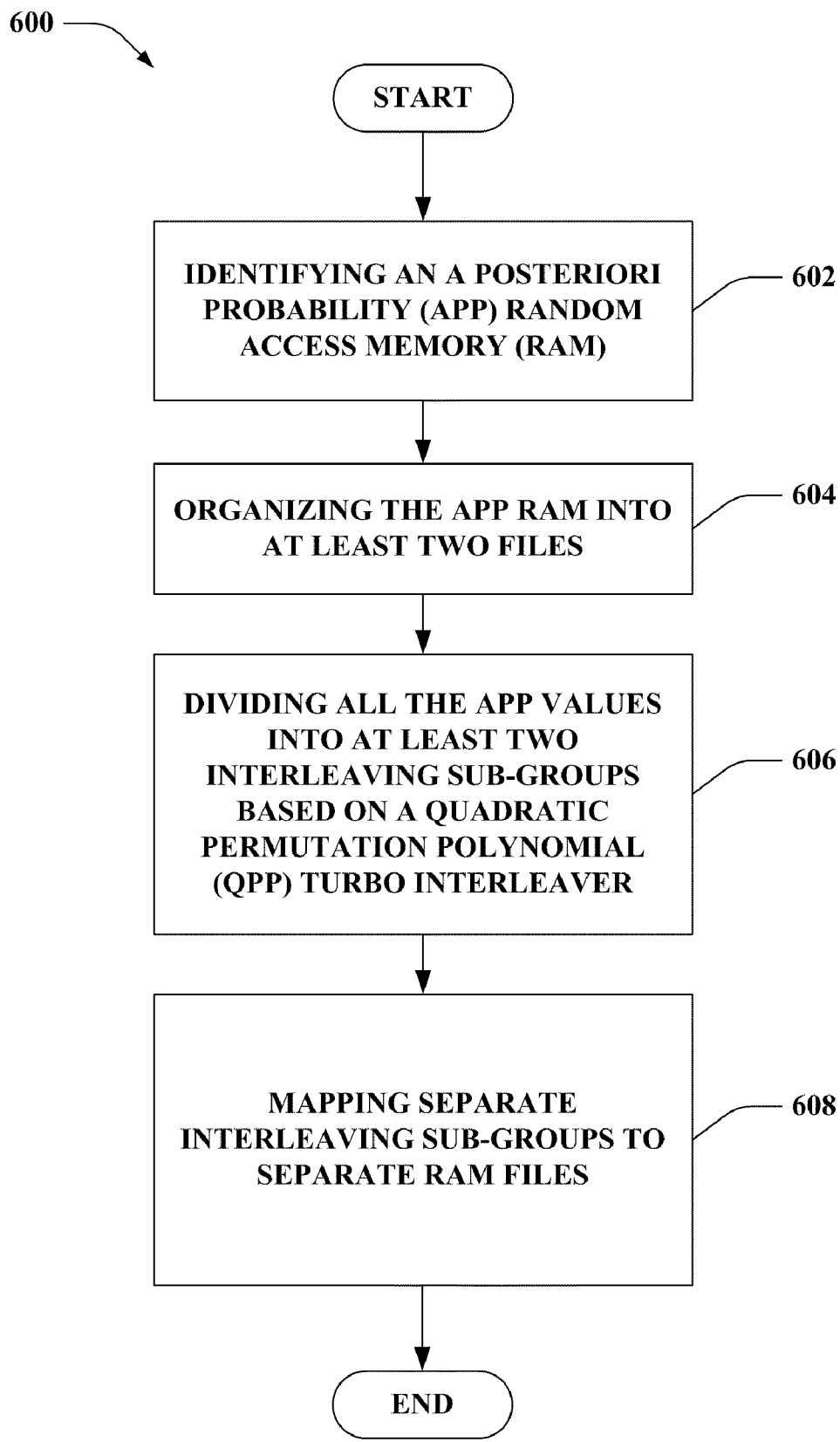
FIG. 6 is an illustration of an example methodology that facilitates employing a turbo decoder that provides contention free memory access.

Referring to FIG. 6, a methodology relating to segmenting RAM to reduce errors during read or write operations is illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Now referring to FIG. 6, a methodology 600 that facilitates employing a turbo decoder that provides contention free memory access. At reference numeral 602, an A Posteriori Probability (APP) Random Access Memory (RAM) can be identified. At reference numeral 604, the APP RAM can be organized into at least two files. At reference numeral 606, all the APP values can be divided into at least two interleaving sub-groups based on a Quadratic Permutation Polynomial (QPP) turbo interleaver. At reference numeral 608, separate interleaving sub-groups can be mapped to separate RAM files.

Figure 7:
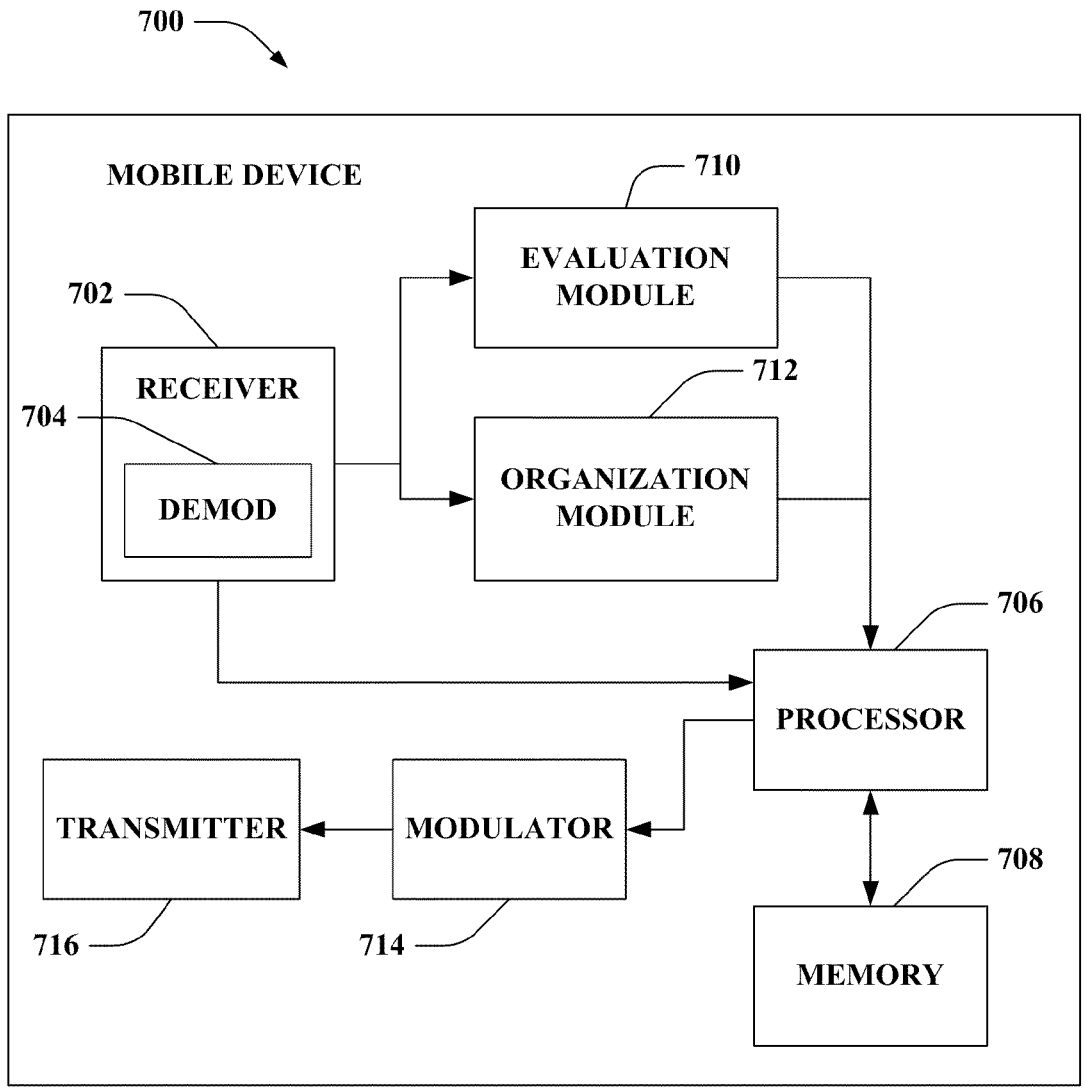
FIG. 7 is an illustration of an example mobile device that facilitates organizing a portion of memory for a turbo decoder to avoid memory collisions in a wireless communication system.

FIG. 7 is an illustration of a mobile device 700 that facilitates organizing a portion of memory for a turbo decoder to avoid memory collisions in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to an evaluation module 710 and/or an organization module 712. The evaluation module 710 can identify and examine a portion of APP RAM. Furthermore, the organization module 712 can segment or partition the APP RAM such that a segment can correspond to a MAP decoder within the turbo decoder in order to prevent memory contention and/or memory collision. The organization module 712 can divide all the APP values into at least two interleaving sub-groups based on a Quadratic Permutation Polynomial (QPP) turbo interleaver. The organization module 712 can map separate interleaving sub-groups to separate RAM files Mobile device 700 still further comprises a modulator 714 and transmitter 716 that respectively modulate and transmit signals to, for instance, a base station, another mobile device, etc. Although depicted as being separate from the processor 606, it is to be appreciated that the evaluation module 710, organization module 712, demodulator 704, and/or modulator 714 can be part of the processor 706 or multiple processors (not shown).

Figure 8:
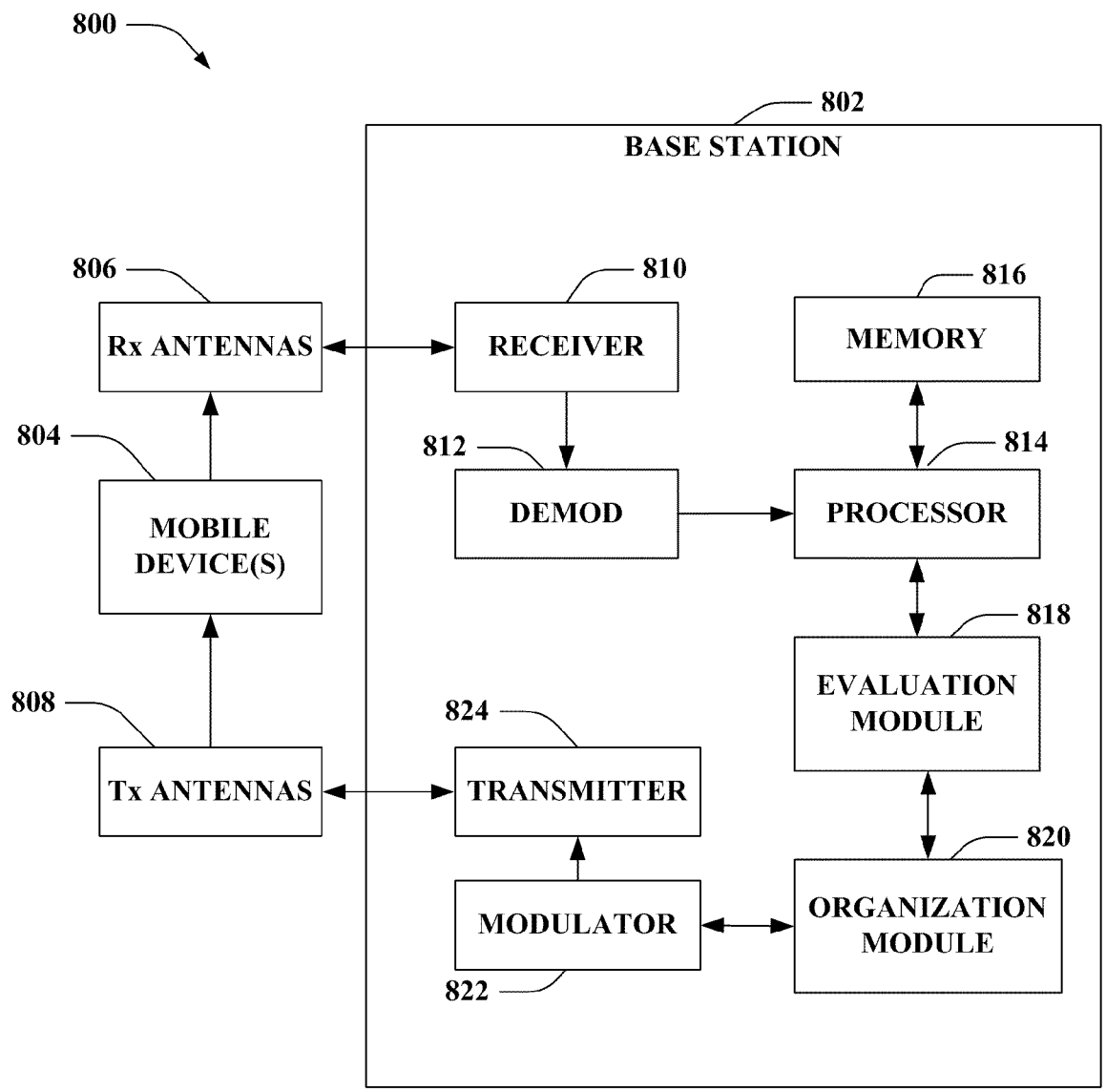
FIG. 8 is an illustration of an example system that facilitates partitioning A Posteriori Probability (APP) Random Access Memory (RAM) to avoid memory collisions in a wireless communication environment.

FIG. 8 is an illustration of a system 800 that facilitates partitioning A Posteriori Probability (APP) Random Access Memory (RAM) to avoid memory collisions in a wireless communication environment as described supra. The system 800 comprises a base station 802 (e.g., access point, ... ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

Processor 814 is further coupled to an evaluation module 818 and/or an organization module 820. The evaluation module 818 can identify APP RAM and as size associated therewith. The organization module 820 can create at least two files and sub-groups within each file within the APP RAM in order to ensure isolation between each file and/or sub-group. The organization module 820 can divide all the APP values into at least two interleaving sub-groups based on a Quadratic Permutation Polynomial (QPP) turbo interleaver. The organization module 820 can map separate interleaving sub-groups to separate RAM files. Furthermore, although depicted as being separate from the processor 814, it is to be appreciated that the evaluation module 818, organization module 820, demodulator 812, and/or modulator 822 can be part of the processor 814 or multiple processors (not shown).

Figure 9:
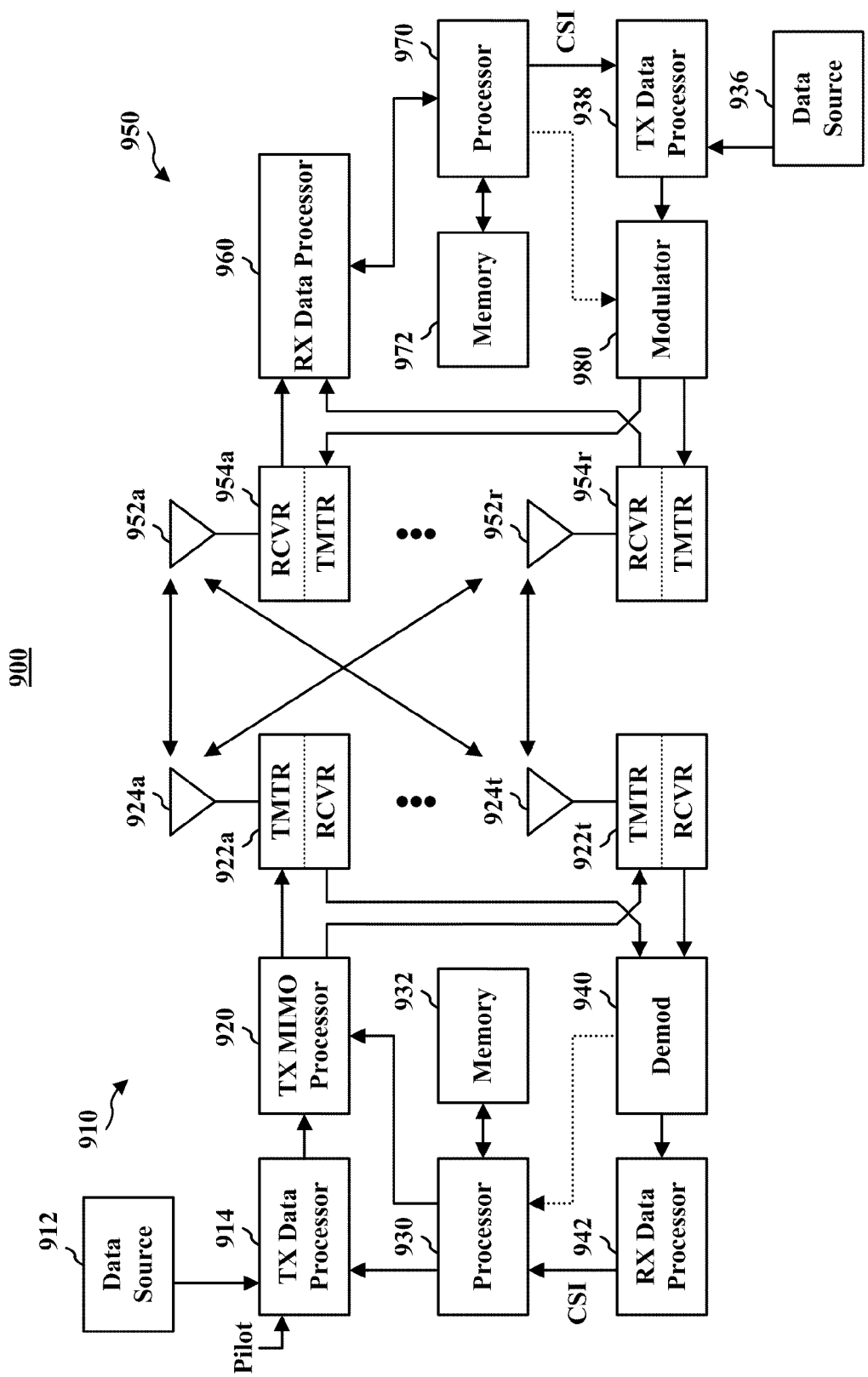
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIGS. 4-5) and/or methods (FIG. 6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
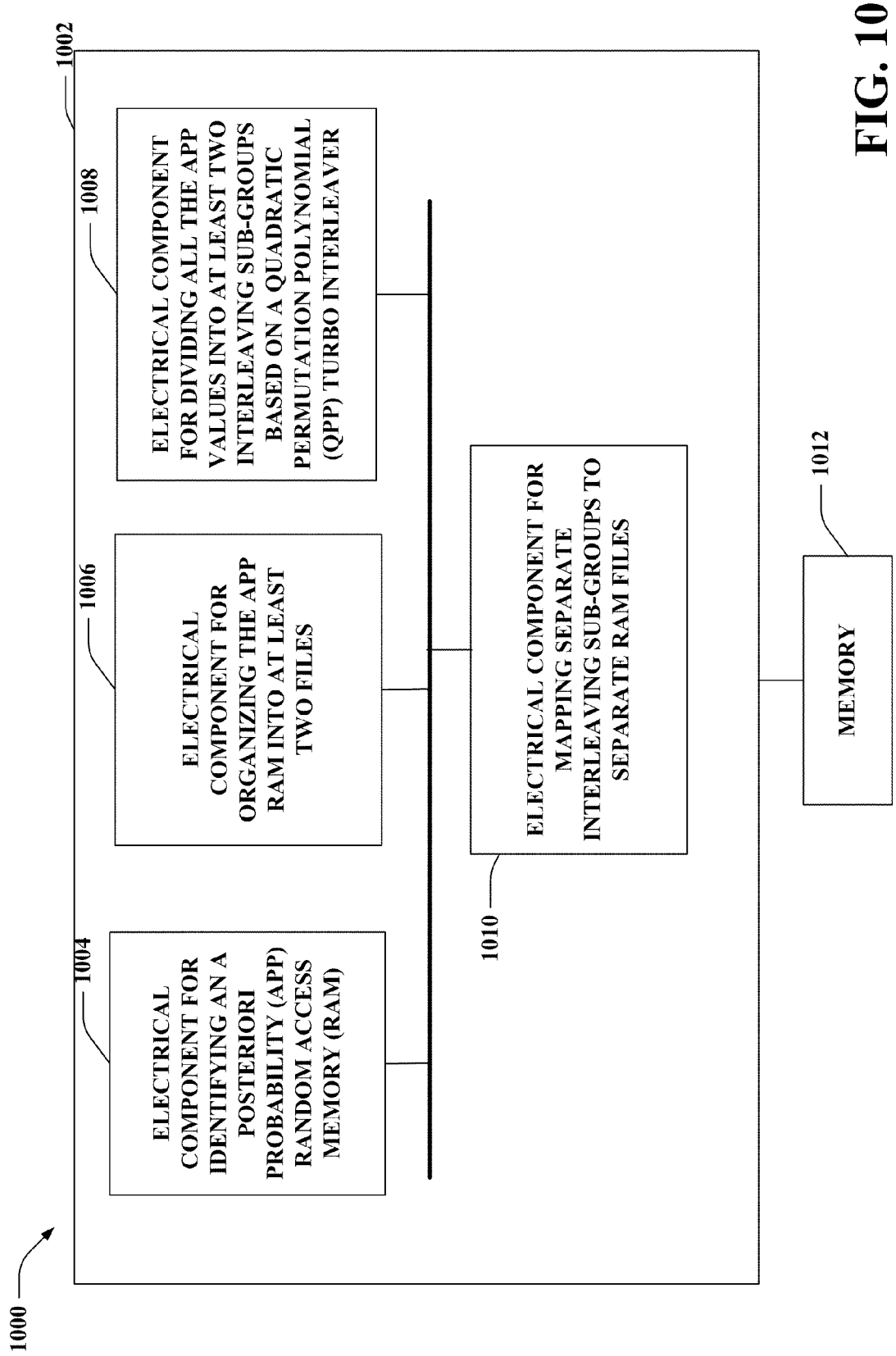
FIG. 10 is an illustration of an example system that facilitates employing a turbo decoder that provides contention free memory access.

With reference to FIG. 10, illustrated is a system 1000 that employs a turbo decoder that provides contention free memory access. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for identifying an A Posteriori Probability (APP) Random Access Memory (RAM) 1004. In addition, the logical grouping 1002 can comprise an electrical component for organizing the APP RAM into at least two files 1006. Moreover, the logical grouping 1002 can include an electrical component for dividing all the APP values into at least two interleaving sub-groups based on a Quadratic Permutation Polynomial (QPP) turbo interleaver 1008. In addition, the logical grouping 1002 can comprise an electrical component for mapping separate interleaving sub-groups to separate RAM files 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system that facilitates employing a turbo decoder that provides contention free memory access, comprising:
identifying an A Posteriori Probability (APP) Random Access Memory (RAM);
organizing the APP RAM into at least two files;
dividing all APP values into at least two interleaving sub-groups based on a Quadratic Permutation Polynomial (QPP) turbo interleaver; and
mapping separate interleaving sub-groups to separate RAM files.

2. The method of claim 1, wherein a MAP parallel decoder employs at least one of a read or a write to at least one of the interleaving sub-groups.

3. The method of claim 1, wherein a MAP parallel decoder is isolated to employ at least one of a read or a write to at least one of the interleaving sub-groups.

4. The method of claim 1, further comprising:
organizing the APP RAM into two (2) RAM files; and
creating a sub-group for each of the two (2) RAM files.

5. The method of claim 4, further comprising employing a clock cycle offset between a write and a read for a sub-group.

6. The method of claim 1, further comprising:
organizing the APP RAM into four (4) RAM files; and
creating a sub-group for each of the four (4) RAM files.

7. The method of claim 6, further comprising utilizing a dual-port RAM design to provide simultaneous read and write.

8. The method of claim 6, further comprising employing a clock cycle offset between a write and a read for a sub-group.

9. The method of claim 6, further comprising:
formatting a first sub-group in a format of nL+4k, where n is an index within the sub-group, L is a length of the sub-group, and k is a sub-group index;
formatting a second sub-group in a format of nL+4k+1, where n is an index within the sub-group, L is a length of the sub-group, and k is a sub-group index;
formatting a third sub-group in a format of nL+4k+2, where n is an index within the sub-group, L is a length of the sub-group, and k is a sub-group index;
formatting a fourth sub-group in a format of nL+4K+3, where n is an index within the sub-group, L is a length of the sub-group, k is a sub-group index; and
accessing a first APP value within a sub-group and a second APP value within a disparate sub-group.

10. The method of claim 1, further comprising:
organizing the APP RAM into eight (8) RAM files; and
creating a sub-group for each of the eight (8) RAM files.

11. The method of claim 10, further comprising utilizing a dual-port RAM design to provide simultaneous read and write.

12. The method of claim 10, further comprising employing a clock cycle offset between a write and a read for a sub-group.

13. The method of claim 1, further comprising:
organizing the APP RAM into sixteen (16) RAM files; and
creating a sub-group for each of the sixteen (16) RAM files.

14. The method of claim 13, further comprising utilizing a dual-port RAM design to provide simultaneous read and write.

15. The method of claim 13, further comprising employing a clock cycle offset between a write and a read for a sub-group.

16. The method of claim 1, further comprising:
organizing the APP RAM into thirty-two (32) RAM files; and
creating a sub-group for each of the thirty-two (32) RAM files.

17. The method of claim 16, further comprising utilizing a dual-port RAM design to provide simultaneous read and write.

18. The method of claim 16, further comprising employing a clock cycle offset between a write and a read for a sub-group.

19. The method of claim 1, further comprising retaining a membership with a sub-group related to the QPP turbo interleaver, wherein the membership to the sub-group of the QPP turbo interleaver translates to membership of the sub-group within APP RAM.

20. A wireless communications apparatus, comprising:
at least one processor configured to:
identify an A Posteriori Probability (APP) Random Access Memory (RAM);
organize the APP RAM into at least two files;
divide all APP values into at least two interleaving sub-groups based on a Quadratic Permutation Polynomial (QPP) turbo interleaver;
map separate interleaving sub-groups to separate RAM files; and
a memory coupled to the at least one processor.

21. The wireless communications apparatus of claim 20, further comprising a MAP parallel decoder configured to employ at least one of a read or a write to at least one of the interleaving sub-groups.

22. The wireless communications apparatus of claim 20, further comprising a MAP parallel decoder isolated to employ at least one of a read or a write to at least one of the interleaving sub-groups.

23. The wireless communications apparatus of claim 20, further comprising:
at least one processor configured to:
organize the APP RAM into two (2) RAM files; and
create a sub-group for each of the two (2) RAM files.

24. The wireless communications apparatus of claim 23, further comprising:
at least one processor configured to:
employ a clock cycle offset between a write and a read for a sub-group.

25. The wireless communications apparatus of claim 20, further comprising:
at least one processor configured to:
organize the APP RAM into four (4) RAM files; and
create a sub-group for each of the four (4) RAM files.

26. The wireless communications apparatus of claim 25, further comprising at least one processor configured to utilize a dual-port RAM design to provide simultaneous read and write.

27. The wireless communications apparatus of claim 25, further comprising at least one processor to employ a clock cycle offset between a write and a reach for a sub-group.

28. The wireless communications apparatus of claim 25, further comprising:
at least one processor configured to:
format a first sub-group in a format of nL+4k, where n is an index within the sub-group, L is a length of the sub-group, and k is a sub-group index;
format a second sub-group in a format of nL+4k+1, where n is an index within the sub-group, L is a length of the sub-group, and k is a sub-group index;
format a third sub-group in a format of nL+4k+2, where n is an index within the sub-group, L is a length of the sub-group, and k is a sub-group index;
format a fourth sub-group in a format of nL+4K+3, where n is an index within the sub-group, L is a length of the sub-group, k is a sub-group index; and
access a first APP value within a sub-group and a second APP value within a disparate sub-group.

29. The wireless communications apparatus of claim 20, further comprising:
at least one processor configured to:
organize the APP RAM into eight (8) RAM files; and
create a sub-group for each of the eight (8) RAM files.

30. The wireless communications apparatus of claim 29, further comprising at least one processor configured to utilize a dual-port RAM design to provide simultaneous read and write.

31. The wireless communications apparatus of claim 29, further comprising at least one processor configured to employ a clock cycle offset between a write and a read for a sub-group.

32. The wireless communications apparatus of claim 20, further comprising:
at least one processor configured to:
organize the APP RAM into sixteen (16) RAM files; and
create a sub-group for each of the sixteen (16) RAM files.

33. The wireless communications apparatus of claim 32, further comprising at least one processor configured to utilize a dual-port RAM design to provide simultaneous read and write.

34. The wireless communications apparatus of claim 32, further comprising at least one processor configured to employ a clock cycle offset between a write and a read for a sub-group.

35. The wireless communications apparatus of claim 20, further comprising:
at least one processor configured to:
organize the APP RAM into thirty-two (32) RAM files; and
create a sub-group for each of the thirty-two (32) RAM files.

36. The wireless communications apparatus of claim 35, further comprising at least one processor configured to utilize a dual-port RAM design to provide simultaneous read and write.

37. The wireless communications apparatus of claim 35, further comprising at least one processor configured to employ a clock cycle offset between a write and a read for a sub-group.

38. The wireless communications apparatus of claim 20, further comprising retaining a membership with a sub-group related to the QPP turbo interleaver, wherein the membership to the sub-group of the QPP turbo interleaver translates to membership of the sub-group within APP RAM.

39. A wireless communications apparatus that employs a turbo decoder that provides contention free memory access, comprising:
means for identifying an A Posteriori Probability (APP) Random Access Memory (RAM);
means for organizing the APP RAM into at least two files;
means for dividing all APP values into at least two interleaving sub-groups based on a Quadratic Permutation Polynomial (QPP) turbo interleaver; and
means for mapping separate interleaving sub-groups to separate RAM files.

40. The wireless communications apparatus of claim 39, further comprising means for employing at least one of a read or a write to at least one of the interleaving sub-groups.

41. The wireless communications apparatus of claim 39, further comprising means isolated for employing at least one of a read or a write to at least one of the interleaving sub-groups.

42. The wireless communications apparatus of claim 39, further comprising:
means for organizing the APP RAM into two (2) RAM files; and
means for creating a sub-group for each of the two (2) RAM files.

43. The wireless communications apparatus of claim 42, further comprising means for employing a clock cycle offset between a write and a read for a sub-group.

44. The wireless communications apparatus of claim 39, further comprising:
means for organizing the APP RAM into four (4) RAM files; and
means for creating a sub-group for each of the four (4) RAM files.

45. The wireless communications apparatus of claim 44, further comprising means for utilizing a dual-port RAM design to provide simultaneous read and write.

46. The wireless communications apparatus of claim 44, further comprising means for employing a clock cycle offset between a write and a read for a sub-group.

47. The wireless communications apparatus of claim 44, further comprising:
means for formatting a first sub-group in a format of nL+4k, where n is an index within the sub-group, L is a length of the sub-group, and k is a sub-group index;
means for formatting a second sub-group in a format of nL+4k+1, where n is an index within the sub-group, L is a length of the sub-group, and k is a sub-group index;
means for formatting a third sub-group in a format of nL+4k+2, where n is an index within the sub-group, L is a length of the sub-group, and k is a sub-group index;
means for formatting a fourth sub-group in a format of nL+4K+3, where n is an index within the sub-group, L is a length of the sub-group, k is a sub-group index; and
means for accessing a first APP value within a sub-group and a second APP value within a disparate sub-group.

48. The wireless communications apparatus of claim 39, further comprising:
means for organizing the APP RAM into eight (8) RAM files; and
means for creating a sub-group for each of the eight (8) RAM files.

49. The wireless communications apparatus of claim 48, further comprising means for utilizing a dual-port RAM design to provide simultaneous read and write.

50. The wireless communications apparatus of claim 48, further comprising means for employing a clock cycle offset between a write and a read for a sub-group.

51. The wireless communications apparatus of claim 48, further comprising:
  means for organizing the APP RAM into sixteen (16) RAM files; and
  means for creating a sub-group for each of the sixteen (16) RAM files.

52. The wireless communications apparatus of claim 51, further comprising means for utilizing a dual-port RAM design to provide simultaneous read and write.

53. The wireless communications apparatus of claim 51, further comprising means for employing a clock cycle offset between a write and a read for a sub-group.

54. The wireless communications apparatus of claim 48, further comprising:
  means for organizing the APP RAM into thirty-two (32) RAM files; and
  means for creating a sub-group for each of the thirty-two (32) RAM files.

55. The wireless communications apparatus of claim 54, further comprising means for utilizing a dual-port RAM design to provide simultaneous read and write.

56. The wireless communications apparatus of claim 54, further comprising means for employing a clock cycle offset between a write and a read for a sub-group.

57. The wireless communications apparatus of claim 39, further comprising means for retaining a membership with a sub-group related to the QPP turbo interleaver, wherein the membership to the sub-group of the QPP turbo interleaver translates to membership of the sub-group within APP RAM.

58. A computer program product, comprising:
  a computer-readable medium comprising:
    code for causing at least one computer to identify an A Posteriori Probability (APP) Random Access Memory (RAM);
    code for causing at least one computer to organize the APP RAM into at least two files;
    code for causing at least one computer to divide all APP values into at least two interleaving sub-groups based on a Quadratic Permutation Polynomial (QPP) turbo interleaver; and
    code for causing at least one computer to map separate interleaving sub-groups to separate RAM files.

* * * * *